United States Patent
Hodulik et al.

(10) Patent No.: US 10,339,975 B2
(45) Date of Patent: *Jul. 2, 2019

(54) VOICE-BASED VIDEO TAGGING

(71) Applicant: GoPro, Inc., San Mateo, CA (US)

(72) Inventors: Nick Hodulik, San Francisco, CA (US); Jonathan Taylor, San Francisco, CA (US); Brian Leong, San Jose, CA (US); Bettina Briz, Palo Alto, CA (US); Lisa Boghosian, San Francisco, CA (US); Mike Knott, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/626,931

(22) Filed: Jun. 19, 2017

(65) Prior Publication Data
US 2017/0287523 A1 Oct. 5, 2017

Related U.S. Application Data

(63) Continuation of application No. 14/530,245, filed on Oct. 31, 2014, now Pat. No. 9,685,194, which is a
(Continued)

(51) Int. Cl.
*G11B 27/10* (2006.01)
*G11B 27/28* (2006.01)
(Continued)

(52) U.S. Cl.
CPC .......... *G11B 27/10* (2013.01); *G06K 9/00718* (2013.01); *G06K 9/00751* (2013.01);
(Continued)

(58) Field of Classification Search
CPC ....... G11B 27/10; G11B 27/28; G11B 27/031; G11B 27/34; G11B 27/13; G11B 27/3081;
(Continued)

(56) References Cited

U.S. PATENT DOCUMENTS

| 5,130,794 A | 7/1992 | Ritchey |
| 6,337,683 B1 | 1/2002 | Gilbert |

(Continued)

FOREIGN PATENT DOCUMENTS

| FR | 2933226 A1 | 1/2010 |
| JP | H09181966 A | 7/1997 |

(Continued)

OTHER PUBLICATIONS

Ernoult, Emeric, "How to Triple Your YouTube Video Views with Facebook", SocialMediaExaminer.com, Nov. 26, 2012, 16 pages.

(Continued)

*Primary Examiner* — Lin Ye
*Assistant Examiner* — Chan T Nguyen
(74) *Attorney, Agent, or Firm* — Esplin & Associates, PC

(57) ABSTRACT

Video and corresponding metadata is accessed. Events of interest within the video are identified based on the corresponding metadata, and best scenes are identified based on the identified events of interest. A video summary can be generated including one or more of the identified best scenes. The video summary can be generated using a video summary template with slots corresponding to video clips selected from among sets of candidate video clips. Best scenes can also be identified by receiving an indication of an event of interest within video from a user during the capture of the video. Metadata patterns representing activities identified within video clips can be identified within other videos, which can subsequently be associated with the identified activities.

20 Claims, 8 Drawing Sheets

Related U.S. Application Data continuation of application No. 14/513,151, filed on Oct. 13, 2014, now Pat. No. 9,984,293.

(60) Provisional application No. 62/039,849, filed on Aug. 20, 2014, provisional application No. 62/028,254, filed on Jul. 23, 2014.

(51) Int. Cl.

| | | |
|---|---|---|
| *G06K 9/00* | (2006.01) | |
| *G11B 27/30* | (2006.01) | |
| *G11B 27/031* | (2006.01) | |
| *G10L 15/06* | (2013.01) | |
| *G10L 15/22* | (2006.01) | |
| *H04N 5/77* | (2006.01) | |
| *G10L 25/57* | (2013.01) | |
| *H04N 5/91* | (2006.01) | |
| *H04N 9/82* | (2006.01) | |
| *G11B 27/13* | (2006.01) | |
| *G11B 27/34* | (2006.01) | |
| *G10L 25/54* | (2013.01) | |

(52) U.S. Cl.
CPC .......... *G10L 15/063* (2013.01); *G10L 15/22* (2013.01); *G10L 25/57* (2013.01); *G11B 27/031* (2013.01); *G11B 27/13* (2013.01); *G11B 27/28* (2013.01); *G11B 27/3081* (2013.01); *G11B 27/34* (2013.01); *H04N 5/77* (2013.01); *H04N 5/772* (2013.01); *H04N 5/91* (2013.01); *H04N 9/8205* (2013.01); *G06K 2009/00738* (2013.01); *G10L 25/54* (2013.01); *G10L 2015/0631* (2013.01); *G10L 2015/223* (2013.01)

(58) Field of Classification Search
CPC ........ H04N 5/772; H04N 9/8205; H04N 5/91; H04N 5/77; G06K 9/00751; G06K 2009/00738; G06K 9/00718; G10L 25/54; G10L 2015/0631; G10L 2015/223; G10L 25/57; G10L 15/22; G10L 15/063
USPC ...................................................... 348/231.4
See application file for complete search history.

(56) References Cited

U.S. PATENT DOCUMENTS

| | | |
|---|---|---|
| 6,593,956 B1 | 7/2003 | Potts |
| 6,633,685 B1 | 10/2003 | Kusama |
| 7,194,636 B2 | 3/2007 | Harrison |
| 7,222,356 B1 | 5/2007 | Yonezawa |
| 7,266,771 B1 | 9/2007 | Tow |
| 7,483,618 B1 | 1/2009 | Edwards |
| 7,512,886 B1 | 3/2009 | Herberger |
| 7,681,223 B2 | 3/2010 | Takahashi |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,706,675 B1 | 4/2014 | Samaniego |
| 8,718,447 B2 | 5/2014 | Yang |
| 8,730,299 B1 | 5/2014 | Kozko |
| 8,763,023 B1 | 6/2014 | Goetz |
| 8,768,142 B1 | 7/2014 | Ju |
| 8,774,560 B2 | 7/2014 | Sugaya |
| 8,910,046 B2 | 12/2014 | Matsuda |
| 8,971,623 B2 | 3/2015 | Gatt |
| 8,988,509 B1 | 3/2015 | Macmillan |
| 8,990,328 B1 | 3/2015 | Grigsby |
| 9,032,299 B2 | 5/2015 | Lyons |
| 9,036,001 B2 | 5/2015 | Chuang |
| 9,041,727 B2 | 5/2015 | Ubillos |
| 9,077,956 B1 * | 7/2015 | Morgan ............... H04N 9/8205 |
| 9,087,297 B1 | 7/2015 | Filippova |
| 9,111,579 B2 | 8/2015 | Meaney |
| 9,142,253 B2 | 9/2015 | Ubillos |
| 9,142,257 B2 | 9/2015 | Woodman |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,342,376 B2 | 5/2016 | Jain |
| 9,396,385 B2 | 7/2016 | Bentley |
| 9,418,283 B1 | 8/2016 | Natarajan |
| 9,423,944 B2 | 8/2016 | Eppolito |
| 9,436,875 B2 | 9/2016 | Curcio |
| 9,473,758 B1 | 10/2016 | Long |
| 9,479,697 B2 | 10/2016 | Aguilar |
| 9,564,173 B2 | 2/2017 | Swenson |
| 9,779,775 B2 | 10/2017 | Pacurariu |
| 2002/0165721 A1 | 11/2002 | Chang |
| 2003/0048843 A1 | 3/2003 | Hashimoto |
| 2004/0001706 A1 | 1/2004 | Jung |
| 2004/0128317 A1 | 7/2004 | Sull |
| 2005/0025454 A1 | 2/2005 | Nakamura |
| 2005/0060365 A1 | 3/2005 | Robinson |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2006/0122842 A1 | 6/2006 | Herberger |
| 2006/0156219 A1 | 7/2006 | Haot |
| 2007/0002946 A1 | 1/2007 | Bouton |
| 2007/0088833 A1 | 4/2007 | Yang |
| 2007/0106419 A1 | 5/2007 | Rachamadugu |
| 2007/0168543 A1 | 7/2007 | Krikorian |
| 2007/0173296 A1 | 7/2007 | Hara |
| 2007/0182861 A1 | 8/2007 | Luo |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0208791 A1 | 8/2008 | Das |
| 2008/0253735 A1 | 10/2008 | Kuspa |
| 2008/0313541 A1 | 12/2008 | Shafton |
| 2009/0019995 A1 | 1/2009 | Miyajima |
| 2009/0027499 A1 | 1/2009 | Nicholl |
| 2009/0125559 A1 | 5/2009 | Yoshino |
| 2009/0213270 A1 | 8/2009 | Ismert |
| 2009/0252474 A1 | 10/2009 | Nashida |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0046842 A1 | 2/2010 | Conwell |
| 2010/0064219 A1 | 3/2010 | Gabrisko |
| 2010/0086216 A1 | 4/2010 | Lee |
| 2010/0104261 A1 | 4/2010 | Liu |
| 2010/0161720 A1 | 6/2010 | Colligan |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |

(56) References Cited

U.S. PATENT DOCUMENTS

| | | |
|---|---|---|
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093605 A1 | 4/2011 | Choudhury |
| 2011/0093798 A1 | 4/2011 | Shahraray |
| 2011/0103700 A1 | 5/2011 | Haseyama |
| 2011/0134240 A1 | 6/2011 | Anderson |
| 2011/0137156 A1 | 6/2011 | Razzaque |
| 2011/0170086 A1 | 7/2011 | Oouchida |
| 2011/0173565 A1 | 7/2011 | Ofek |
| 2011/0206351 A1 | 8/2011 | Givoly |
| 2011/0211040 A1 | 9/2011 | Lindemann |
| 2011/0242098 A1 | 10/2011 | Tamaru |
| 2011/0258049 A1 | 10/2011 | Ramer |
| 2011/0293250 A1 | 12/2011 | Deever |
| 2011/0317981 A1 | 12/2011 | Fay |
| 2011/0320322 A1 | 12/2011 | Roslak |
| 2012/0014673 A1 | 1/2012 | O'Dwyer |
| 2012/0020656 A1 | 1/2012 | Farmer |
| 2012/0027381 A1 | 2/2012 | Kataoka |
| 2012/0030029 A1 | 2/2012 | Flinn |
| 2012/0030263 A1 | 2/2012 | John |
| 2012/0057852 A1 | 3/2012 | Devleeschouwer |
| 2012/0114233 A1 | 5/2012 | Gunatilake |
| 2012/0123780 A1 | 5/2012 | Gao |
| 2012/0127169 A1 | 5/2012 | Barcay |
| 2012/0131591 A1 | 5/2012 | Moorthi |
| 2012/0141019 A1 | 6/2012 | Zhang |
| 2012/0192225 A1 | 7/2012 | Harwell |
| 2012/0198319 A1 | 8/2012 | Agnoli |
| 2012/0206565 A1 | 8/2012 | Villmer |
| 2012/0209889 A1 | 8/2012 | Agnoli |
| 2012/0210205 A1 | 8/2012 | Sherwood |
| 2012/0210228 A1 | 8/2012 | Wang |
| 2012/0246114 A1 | 9/2012 | Edmiston |
| 2012/0283574 A1 | 11/2012 | Park |
| 2012/0311448 A1 | 12/2012 | Achour |
| 2013/0024805 A1 | 1/2013 | In |
| 2013/0041948 A1 | 2/2013 | Tseng |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0104177 A1 | 4/2013 | Kwan |
| 2013/0114902 A1 | 5/2013 | Sukthankar |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0182166 A1 | 7/2013 | Shimokawa |
| 2013/0185388 A1 | 7/2013 | Mackie |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0222583 A1 | 8/2013 | Earnshaw |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0263002 A1 | 10/2013 | Park |
| 2013/0282747 A1 | 10/2013 | Cheng |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0330019 A1 | 12/2013 | Kim |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0153900 A1 | 6/2014 | Tanaka |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341527 A1 | 11/2014 | Hurley |
| 2014/0341528 A1* | 11/2014 | Mahate ............ G06K 9/00711 386/224 |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0058709 A1 | 2/2015 | Zaletel |
| 2015/0067811 A1 | 3/2015 | Agnew |
| 2015/0071547 A1 | 3/2015 | Keating |
| 2015/0085111 A1 | 3/2015 | Lavery |
| 2015/0113009 A1 | 4/2015 | Zhou |
| 2015/0154452 A1 | 6/2015 | Bentley |
| 2015/0156247 A1 | 6/2015 | Hensel |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256689 A1 | 9/2015 | Erkkila |
| 2015/0256746 A1 | 9/2015 | Macmillan |
| 2015/0256808 A1 | 9/2015 | Macmillan |
| 2015/0262616 A1 | 9/2015 | Jaime |
| 2015/0271483 A1 | 9/2015 | Sun |
| 2015/0281710 A1 | 10/2015 | Sievert |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0373281 A1 | 12/2015 | White |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0094601 A1 | 3/2016 | Besehanic |
| 2016/0098941 A1 | 4/2016 | Kerluke |
| 2016/0103830 A1 | 4/2016 | Cheong |
| 2016/0119551 A1 | 4/2016 | Brown |
| 2016/0133295 A1 | 5/2016 | Boyle |
| 2016/0189752 A1 | 6/2016 | Galant |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0300594 A1 | 10/2016 | Allen |

(56) References Cited

U.S. PATENT DOCUMENTS

| | | | |
|---|---|---|---|
| 2016/0358603 A1 | 12/2016 | Azam | |
| 2016/0366330 A1 | 12/2016 | Boliek | |
| 2017/0006214 A1 | 1/2017 | Andreassen | |

FOREIGN PATENT DOCUMENTS

| | | |
|---|---|---|
| JP | 2005252459 A | 9/2005 |
| JP | 2006053694 A | 2/2006 |
| JP | 2008059121 A | 3/2008 |
| JP | 2009053748 A | 3/2009 |
| JP | 2011188004 A | 9/2011 |
| WO | 2001020466 | 3/2001 |
| WO | 2006001361 A1 | 1/2006 |
| WO | 2009040538 | 4/2009 |
| WO | 2012057623 A1 | 5/2012 |
| WO | 2012086120 A1 | 6/2012 |

OTHER PUBLICATIONS

PCT International Written Opinion for PCT/US2015/041624, dated Dec. 17, 2015, 7 Pages.

Ricker, "First Click: TomTom's Bandit camera beats GoPro with software" Mar. 9, 2016 URL: http://www.theverge.com/2016/3/9/11179298/tomtom-bandit-beats-gopro (6 pages).

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

PCT International Search Report and Written Opinion for PCT/US2015/023680, dated Oct. 6, 2015, 13 pages.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

PSonar URL: http://www.psonar.com/about retrieved on Aug. 24, 2016, 3 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Japanese Office Action for JP Application No. 2013-140131, dated Aug. 5, 2014, 6 pages.

Office Action for U.S. Appl. No. 13/831,124, dated Mar. 19, 2015, 14 pages.

Supplemental European Search Report for 15773596.0 dated Aug. 4, 2017, 15 pages.

Kiyoharu Aizawa et al., Efficient retrieval of life log based on context and content, Proceedings of the 1st. ACM Workshop on Continuous Archival and Retrieval of Personal Experiences. CARPE '04. New York, NY, Oct. 15, 2004; [Proceedings of the Workshop on Continuous Archival and Retrieval of Personal Experiences. CARPE], Oct. 15, 2004; Oct. 15, 2004-Oct. 15, 2004 New York, NY : ACM, US, Source info:pp. 22-31.

\* cited by examiner

VOICE-BASED VIDEO TAGGING

BACKGROUND

Technical Field

This disclosure relates to a camera system, and more specifically, to processing video data captured using a camera system.

Description of the Related Art

Digital cameras are increasingly used to capture videos in a variety of settings, for instance outdoors or in a sports environment. However, as users capture increasingly more and longer videos, video management becomes increasingly difficult. Manually searching through raw videos ("scrubbing") to identify the best scenes is extremely time consuming. Automated video processing to identify the best scenes can be very resource-intensive, particularly with high-resolution raw-format video data. Accordingly, an improved method of automatically identifying the best scenes in captured videos and generating video summaries including the identified best scenes can beneficially improve a user's video editing experience.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 is a block diagram of a camera system environment according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

Figure 1:
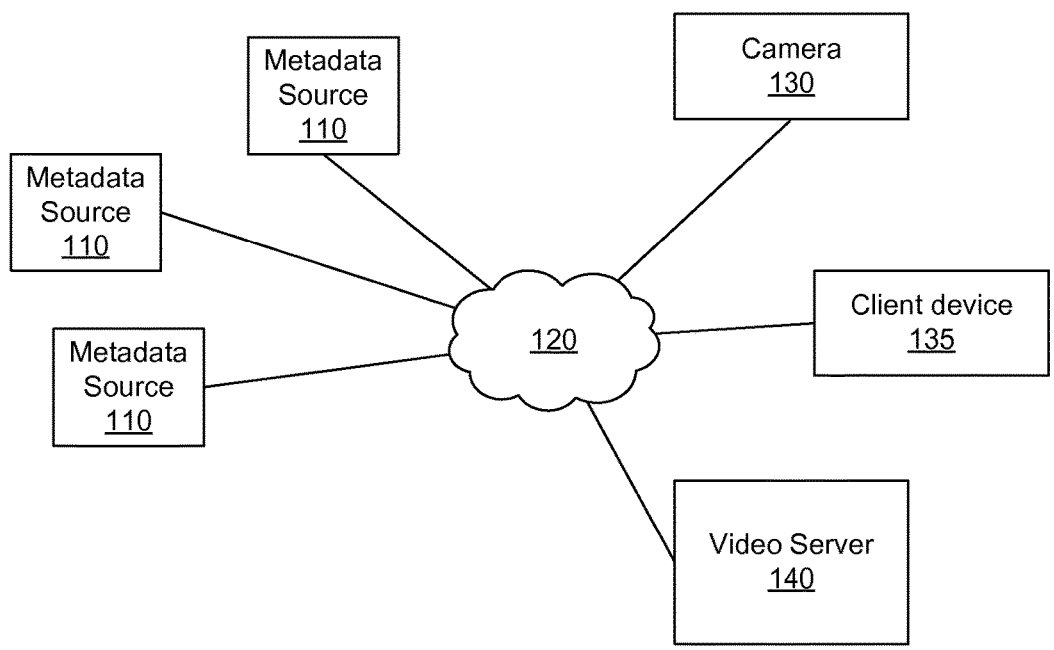

FIG. 1 is a block diagram of a camera system environment, according to one embodiment. The camera system environment 100 includes one or more metadata sources 110, a network 120, a camera 130, a client device 135 and a video server 140. In alternative configurations, different and/or additional components may be included in the camera system environment 100. Examples of metadata sources 110 include sensors (such as accelerometers, speedometers, rotation sensors, GPS sensors, altimeters, and the like), camera inputs (such as an image sensor, microphones, buttons, and the like), and data sources (such as external servers, web pages, local memory, and the like). Although not shown in FIG. 1, it should be noted that in some embodiments, one or more of the metadata sources 110 can be included within the camera 130.

The camera 130 can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the camera lens and/or performing other functions. As described in greater detail in conjunction with FIG. 2 below, the camera 130 can include sensors to capture metadata associated with video data, such as motion data, speed data, acceleration data, altitude data, GPS data, and the like. A user uses the camera 130 to record or capture videos in conjunction with associated metadata which the user can edit at a later time.

The video server 140 receives and stores videos captured by the camera 130 allowing a user to access the videos at a later time. In one embodiment, the video server 140 provides the user with an interface, such as a web page or native application installed on the client device 135, to interact with and/or edit the videos captured by the user. In one embodiment, the video server 140 generates video summaries of various videos stored at the video server, as described in greater detail in conjunction with FIG. 3 and FIG. 4 below. As used herein, "video summary" refers to a generated video including portions of one or more other videos. A video summary often includes highlights (or "best scenes") of a video captured by a user. In some embodiments, best scenes include events of interest within the captured video, scenes associated with certain metadata (such as an above threshold altitude or speed), scenes associated with certain camera or environment characteristics, and the like. For example, in a video captured during a snowboarding trip, the best scenes in the video can include jumps performed by the user or crashes in which the user was involved. In addition to including one or more highlights of the video, a video summary can also capture the experience, theme, or story associated with the video without requiring significant manual editing by the user. In one embodiment, the video server 140 identifies the best scenes in raw video based on the metadata associated with the video. The video server 140 may then generate a video summary using the identified best scenes of the video. The metadata can either be captured by the camera 130 during the capture of the video or can be retrieved from one or more metadata sources 110 after the capture of the video.

Metadata includes information about the video itself, the camera used to capture the video, the environment or setting in which a video is captured or any other information associated with the capture of the video. For example, metadata can include acceleration data representative of the acceleration of a camera 130 attached to a user as the user captures a video while snowboarding down a mountain. Such acceleration metadata helps identify events representing a sudden change in acceleration during the capture of the video, such as a crash the user may encounter or a jump the user performs. Thus, metadata associated with captured video can be used to identify best scenes in a video recorded by a user without relying on image processing techniques or manual curation by a user.

Examples of metadata include: telemetry data (such as motion data, velocity data, and acceleration data) captured by sensors on the camera 130; location information captured by a GPS receiver of the camera 130; compass heading information; altitude information of the camera 130; biometric data such as the heart rate of the user, breathing of the user, eye movement of the user, body movement of the user, and the like; vehicle data such as the velocity or acceleration of the vehicle, the brake pressure of the vehicle, or the rotations per minute (RPM) of the vehicle engine; or environment data such as the weather information associated with the capture of the video. The video server 140 may receive metadata directly from the camera 130 (for instance, in association with receiving video from the camera), from a client device 135 (such as a mobile phone, computer, or vehicle system associated with the capture of video), or from external metadata sources 110 such as web pages, blogs, databases, social networking sites, or servers or devices storing information associated with the user (e.g., a user may use a fitness device recording fitness data).

A user can interact with interfaces provided by the video server 140 via the client device 135. The client device 135 is any computing device capable of receiving user inputs as well as transmitting and/or receiving data via the network 120. In one embodiment, the client device 135 is a conventional computer system, such as a desktop or a laptop computer. Alternatively, the client device 135 may be a device having computer functionality, such as a personal digital assistant (PDA), a mobile telephone, a smartphone or another suitable device. The user can use the client device to view and interact with or edit videos stored on the video server 140. For example, the user can view web pages including video summaries for a set of videos captured by the camera 130 via a web browser on the client device 135.

One or more input devices associated with the client device 135 receive input from the user. For example, the client device 135 can include a touch-sensitive display, a keyboard, a trackpad, a mouse, a voice recognition system, and the like. In some embodiments, the client device 135 can access video data and/or metadata from the camera 130 or one or more metadata sources 110, and can transfer the accessed metadata to the video server 140. For example, the client device may retrieve videos and metadata associated with the videos from the camera via a universal serial bus (USB) cable coupling the camera 130 and the client device 135. The client device can then upload the retrieved videos and metadata to the video server 140.

In one embodiment, the client device 135 executes an application allowing a user of the client device 135 to interact with the video server 140. For example, a user can identify metadata properties using an application executing on the client device 135, and the application can communicate the identified metadata properties selected by a user to the video server 140 to generate and/or customize a video summary. As another example, the client device 135 can execute a web browser configured to allow a user to select video summary properties, which in turn can communicate the selected video summary properties to the video server 140 for use in generating a video summary. In one embodiment, the client device 135 interacts with the video server 140 through an application programming interface (API) running on a native operating system of the client device 135, such as IOS® or ANDROID™. While FIG. 1 shows a single client device 135, in various embodiments, any number of client devices 135 may communicate with the video server 140.

The video server 140 communicates with the client device 135, the metadata sources 110, and the camera 130 via the network 120, which may include any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable technique or techniques. It should be noted that in some embodiments, the video server 140 is located within the camera 130 itself.

Example Camera Configuration

Figure 2:
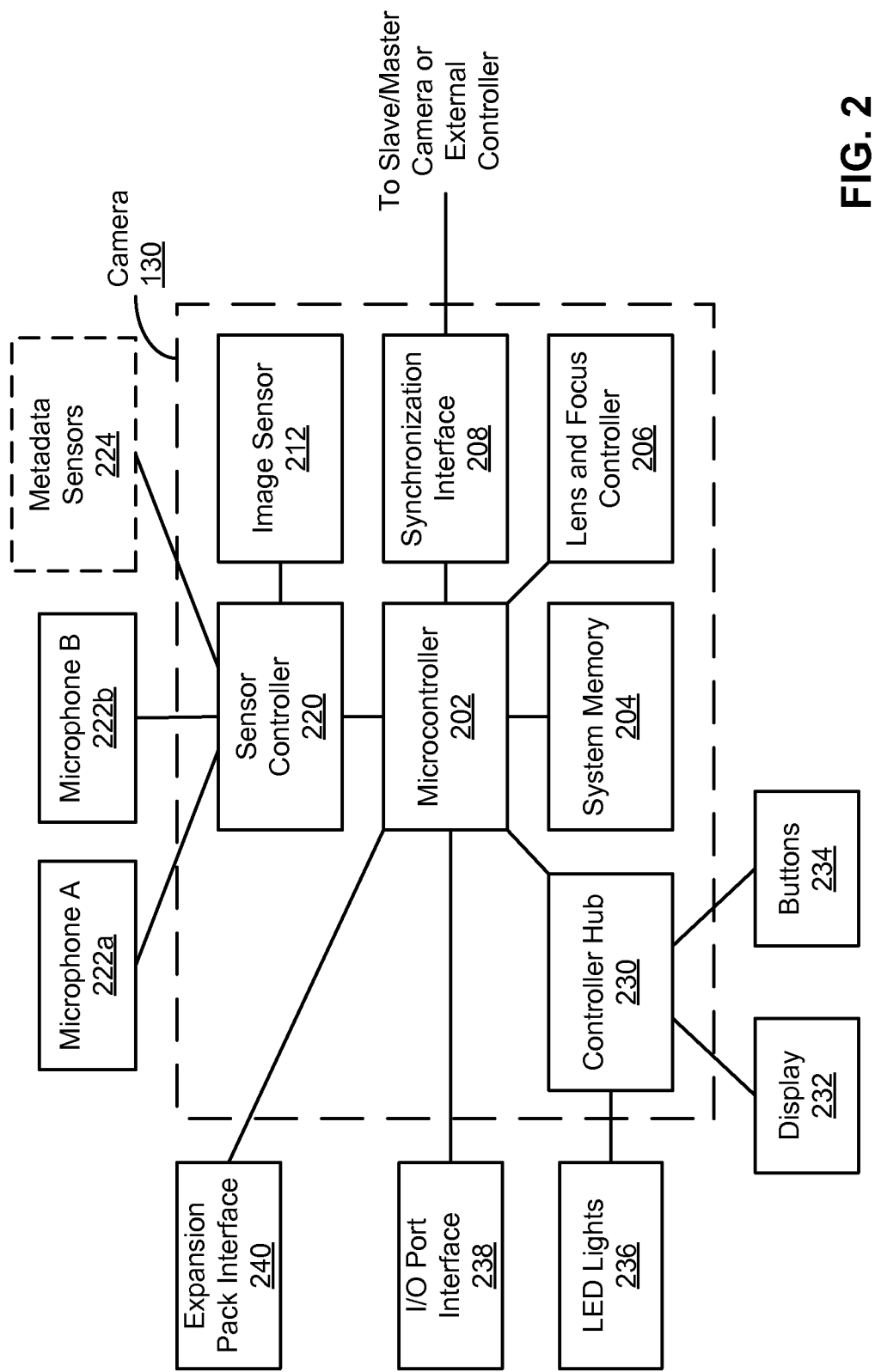
FIG. 2 is a block diagram illustrating a camera system, according to one embodiment.

FIG. 2 is a block diagram illustrating a camera system, according to one embodiment. The camera 130 includes one or more microcontrollers 202 (such as microprocessors) that control the operation and functionality of the camera 130. A lens and focus controller 206 is configured to control the operation and configuration of the camera lens. A system memory 204 is configured to store executable computer instructions that, when executed by the microcontroller 202, perform the camera functionalities described herein. A synchronization interface 208 is configured to synchronize the camera 130 with other cameras or with other external devices, such as a remote control, a second camera 130, a smartphone, a client device 135, or a video server 140.

A controller hub 230 transmits and receives information from various I/O components. In one embodiment, the controller hub 230 interfaces with LED lights 236, a display 232, buttons 234, microphones such as microphones 222, speakers, and the like.

A sensor controller 220 receives image or video input from an image sensor 212. The sensor controller 220 receives audio inputs from one or more microphones, such as microphone 212a and microphone 212b. Metadata sensors 224, such as an accelerometer, a gyroscope, a magnetometer, a global positioning system (GPS) sensor, or an altimeter may be coupled to the sensor controller 220. The metadata sensors 224 each collect data measuring the environment and aspect in which the video is captured. For example, the accelerometer 220 collects motion data, comprising velocity and/or acceleration vectors representative of motion of the camera 130, the gyroscope provides orientation data describing the orientation of the camera 130, the GPS sensor provides GPS coordinates identifying the location of the camera 130, and the altimeter measures the altitude of the camera 130. The metadata sensors 224 are rigidly coupled to the camera 130 such that any motion, orientation or change in location experienced by the camera 130 is also experienced by the metadata sensors 224. The sensor controller 220 synchronizes the various types of data received from the various sensors connected to the sensor controller 220. For example, the sensor controller 220 associates a time stamp representing when the data was captured by each sensor. Thus, using the time stamp, the measurements received from the metadata sensors 224 are correlated with the corresponding video frames captured by the image sensor 212. In one embodiment, the sensor controller begins collecting metadata from the metadata sources when the camera 130 begins recording a video. In one embodiment, the sensor controller 220 or the microcontroller 202 performs operations on the received metadata to generate additional metadata information. For example, the microcontroller may integrate the received acceleration data to determine the velocity profile of the camera 130 during the recording of a video.

Additional components connected to the microcontroller 202 include an I/O port interface 238 and an expansion pack interface 240. The I/O port interface 238 may facilitate the receiving or transmitting video or audio information through an I/O port. Examples of I/O ports or interfaces include USB ports, HDMI ports, Ethernet ports, audioports, and the like. Furthermore, embodiments of the I/O port interface 238 may include wireless ports that can accommodate wireless connections. Examples of wireless ports include Bluetooth, Wireless USB, Near Field Communication (NFC), and the like. The expansion pack interface 240 is configured to interface with camera add-ons and removable expansion packs, such as a display module, an extra battery module, a wireless module, and the like.

Example Video Server Architecture

Figure 3:
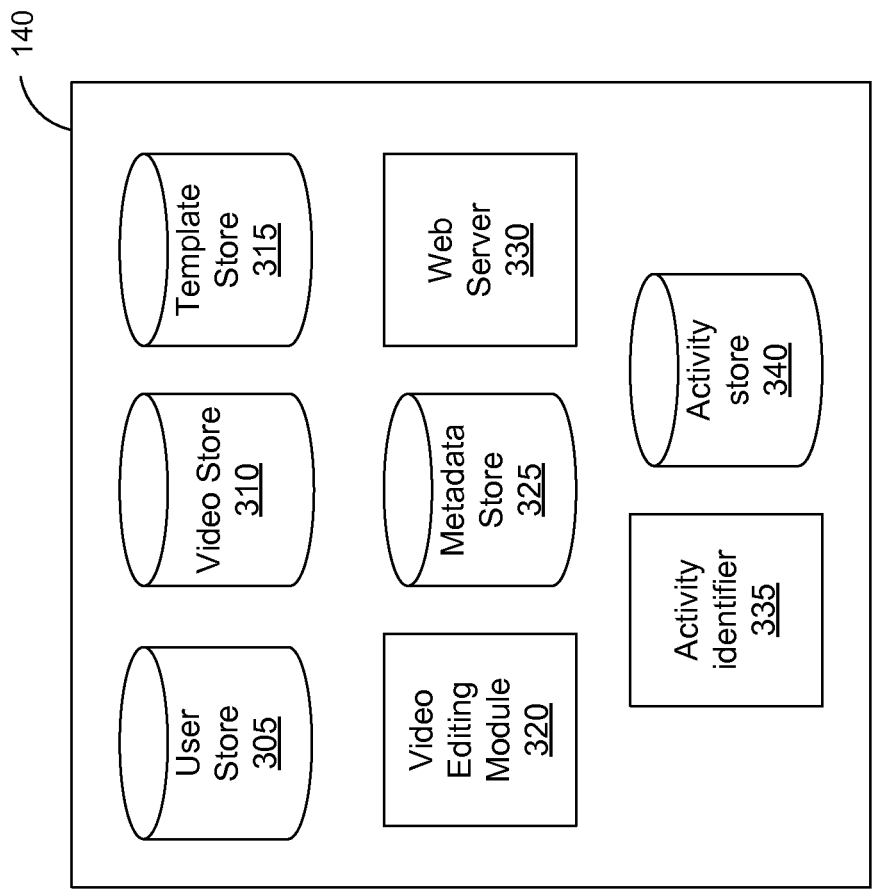
FIG. 3 is a block diagram of a video server, according to one embodiment.

FIG. 3 is a block diagram of an architecture of the video server. The video server 140 in the embodiment of FIG. 3 includes a user storage module 305 ("user store" hereinafter), a video storage module 310 ("video store" hereinafter), a template storage module 315 ("template store" hereinafter), a video editing module 320, a metadata storage module 325 ("metadata store" hereinafter), a web server 330, an activity identifier 335, and an activity storage module 340 ("activity store" hereinafter). In other embodiments, the video server 140 may include additional, fewer, or different components for performing the functionalities described herein. Conventional components such as network interfaces, security functions, load balancers, failover servers, management and network operations consoles, and the like are not shown so as to not obscure the details of the system architecture.

Each user of the video server 140 creates a user account, and user account information is stored in the user store 305. A user account includes information provided by the user (such as biographic information, geographic information, and the like) and may also include additional information inferred by the video server 140 (such as information associated with a user's previous use of a camera). Examples of user information include a username, a first and last name, contact information, a user's hometown or geographic region, other location information associated with the user, and the like. The user store 305 may include data describing interactions between a user and videos captured by the user. For example, a user account can include a unique identifier associating videos uploaded by the user with the user's user account.

The video store 310 stores videos captured and uploaded by users of the video server 140. The video server 140 may access videos captured using the camera 130 and store the videos in the video store 310. In one example, the video server 140 may provide the user with an interface executing on the client device 135 that the user may use to upload videos to the video store 315. In one embodiment, the video server 140 indexes videos retrieved from the camera 130 or the client device 135, and stores information associated with the indexed videos in the video store. For example, the video server 140 provides the user with an interface to select one or more index filters used to index videos. Examples of index filters include but are not limited to: the type of equipment used by the user (e.g., ski equipment, mountain bike equipment, etc.), the type of activity being performed by the user while the video was captured (e.g., snowboarding, mountain biking, etc.), the time and data at which the video was captured, or the type of camera 130 used by the user.

In some embodiments, the video server 140 generates a unique identifier for each video stored in the video store 310. In some embodiments, the generated identifier for a particular video is unique to a particular user. For example, each user can be associated with a first unique identifier (such as a 10-digit alphanumeric string), and each video captured by a user is associated with a second unique identifier made up of the first unique identifier associated with the user concatenated with a video identifier (such as an 8-digit alphanumeric string unique to the user). Thus, each video identifier is unique among all videos stored at the video store 310, and can be used to identify the user that captured the video.

The metadata store 325 stores metadata associated with videos stored by the video store 310. For instance, the video server 140 can retrieve metadata from the camera 130, the client device 135, or one or more metadata sources 110, can associate the metadata with the corresponding video (for instance by associating the metadata with the unique video identifier), and can store the metadata in the metadata store 325. The metadata store 325 can store any type of metadata, including but not limited to the types of metadata described herein. It should be noted that in some embodiments, metadata corresponding to a video is stored within a video file itself, and not in a separate storage module.

The web server 330 provides a communicative interface between the video server 140 and other entities of the environment of FIG. 1. For example, the web server 330 can access videos and associated metadata from the camera 130 or the client device 135 to store in the video store 310 and the metadata store 325, respectively. The web server 330 can also receive user input provided to the client device 135, can request video summary templates or other information from a client device 135 for use in generating a video summary, and can provide a generated video summary to the client device or another external entity.

Event of Interest/Activity Identification

The video editing module 320 analyzes metadata associated with a video to identify best scenes of the video based on identified events of interest or activities, and generates a video summary including one or more of the identified best scenes of the video. The video editing module 320 first accesses one or more videos from the video store 310, and accesses metadata associated with the accessed videos from the metadata store 325. The video editing module 320 then analyzes the metadata to identify events of interest in the metadata. Examples of events of interest can include abrupt changes or anomalies in the metadata, such as a peak or valley in metadata maximum or minimum values within the metadata, metadata exceeding or falling below particular thresholds, metadata within a threshold of predetermine values (for instance, within 20 meters of a particular location or within), and the like. The video editing module 320 can identify events of interest in videos based on any other type of metadata, such as a heart rate of a user, orientation information, and the like.

For example, the video editing module 320 can identify any of the following as an event of interest within the metadata: a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a user location within a pre-determined threshold distance from a pre-determined location, a threshold change in or pre-determined orientation of the camera or user, a proximity to another user or location, a time within a threshold of a pre-determined time, a pre-determined environmental condition (such as a particular weather event, a particular temperature, a sporting event, a human gathering, or any other suitable event), or any other event associated with particular metadata.

In some embodiments, a user can manually indicate an event of interest during capture of the video. For example, a user can press a button on the camera or a camera remote or otherwise interact with the camera during the capture of video to tag the video as including an event of interest. The manually tagged event of interest can be indicated within metadata associated with the captured video. For example, if a user is capturing video while snowboarding and presses a camera button associated with manually tagging an event of interest, the camera creates metadata associated with the captured video indicating that the video includes an event of interest, and indicating a time or portion within the captured video at which the tagged event of interest occurs. In some embodiments, the manual tagging of an event of interest by a user while capturing video is stored as a flag within a resulting video file. The location of the flag within the video file corresponds to a time within the video at which the user manually tags the event of interest.

In some embodiments, a user can manually indicate an event of interest during capture of the video using a spoken command or audio signal. For instance, a user can say "Tag" or "Tag my moment" during the capture of video to tag the video as including an event of interest. The audio-tagged event of interest can be indicated within metadata associated with the captured video. The spoken command can be pre-programmed, for instance by a manufacturer, programmer, or seller of the camera system, or can be customized by a user of the camera system. For instance, a user can speak a command or other audio signal into a camera during a training period (for instance, in response to configuring the camera into a training mode, or in response to the selection of a button or interface option associated with training a camera to receive a spoken command). The spoken command or audio signal can be repeated during the training mode a threshold number of times (such as once, twice, or any number of times necessary for the purposes of identifying audio patterns as described herein), and the camera system can identify an audio pattern associated with the spoken commands or audio signals received during the training period. The audio pattern is then stored at the camera, and, during a video capture configuration, the camera can identify the audio pattern in a spoken command or audio signal received from a user of the camera, and can manually tag an event of interest during the capture of video in response to detecting the stored audio pattern within the received spoken command or audio signal. In some embodiments, the audio pattern is specific to spoken commands or audio signals received from a particular user and can be detected only in spoken commands or audio signals received from the particular user. In other embodiments, the audio pattern can be identified within spoken commands or audio signals received from any user. It should be noted that manually identified events of interest can be associated with captured video by the camera itself, and can be identified by a system to which the captured video is uploaded from the camera without significant additional post-processing.

As noted above, the video editing module 320 can identify events of interest based on activities performed by users when the videos are captured. For example, a jump while snowboarding or a crash while skateboarding can be identified as events of interest. Activities can be identified by the activity identifier module 335 based on metadata associated with the video captured while performing the activities. Continuing with the previous example, metadata associated with a particular altitude and a parabolic upward and then downward velocity can be identified as a "snowboarding jump", and a sudden slowdown in velocity and accompanying negative acceleration can be identified as a "skateboarding crash".

The video editing module 320 can identify events of interest based on audio captured in conjunction with the video. In some embodiments, the video editing module identifies events of interest based on one or more spoken words or phrases in captured audio. For example, if audio of a user saying "Holy Smokes!" is captured, the video editing module can determine that an event of interest just took place (e.g., within the previous 5 seconds or other threshold of time), and if audio of a user saying "Oh no! Watch out!" is captured, the video editing module can determine that an event of interest is about to occur (e.g., within the next 5 seconds or other threshold of time). In addition to identifying events of interest based on captured dialogue, the video editing module can identify an event of identify based on captured sound effects, captured audio exceeding a magnitude or pitch threshold, or captured audio satisfying any other suitable criteria.

In some embodiments, the video editing module 320 can identify video that does not include events of interest. For instance, the video editing module 320 can identify video that is associated with metadata patterns determined to not be of interest to a user. Such patterns can include metadata associated with a below-threshold movement, a below-threshold luminosity, a lack of faces or other recognizable objects within the video, audio data that does not include dialogue or other notable sound effects, and the like. In some embodiments, video determined to not include events of interest can be disqualified from consideration for inclusion in a generated video summary, or can be hidden from a user viewing captured video (in order to increase the chance that the remaining video presented to the user does include events of interest).

The activity identifier module 335 can receive a manual identification of an activity within videos from one or more users. In some embodiments, activities can be tagged during the capture of video. For instance, if a user is about to capture video while performing a snowboarding jump, the user can manually tag the video being captured or about to be captured as "snowboarding jump". In some embodiments, activities can be tagged after the video is captured, for instance during playback of the video. For instance, a user can tag an activity in a video as a skateboarding crash upon playback of the video.

Activity tags in videos can be stored within metadata associated with the videos. For videos stored in the video store 310, the metadata including activity tags associated with the videos is stored in the metadata store 325. In some embodiments, the activity identifier module 335 identifies metadata patterns associated with particular activities and/or activity tags. For instance, metadata associated with several videos tagged with the activity "skydiving" can be analyzed to identify similarities within the metadata, such as a steep increase in acceleration at a high altitude followed by a high velocity at decreasing altitudes. Metadata patterns associated with particular activities are stored in the activity store 340.

In some embodiments, metadata patterns associated with particular activities can include audio data patterns. For instance, particular sound effects, words or phrases of dialogue, or the like can be associated with particular activities. For example, the spoken phrase "nice wave" can be associated with surfing, and the sound of a revving car engine can be associated with driving or racing a vehicle. In some embodiments, metadata patterns used to identify activities can include the use of particular camera mounts associated with the activities in capturing video. For example, a camera can detect that it is coupled to a snowboard mount, and video captured while coupled to the snowboard mount can be associated with the activity of snowboarding.

Once metadata patterns associated with particular activities are identified, the activity identifier module 335 can identify metadata patterns in metadata associated with other videos, and can tag or associate other videos associated with metadata including the identified metadata patterns with the activities associated with the identified metadata patterns. The activity identifier module 335 can identify and store a plurality of metadata patterns associated with a plurality of activities within the activity store 340. Metadata patterns stored in the activity store 340 can be identified within videos captured by one user, and can be used by the activity identifier module 335 to identify activities within videos captured by the user. Alternatively, metadata patterns can be identified within videos captured by a first plurality of users, and can be used by the activity identifier module 335 to identify activities within videos captured by a second plurality of users including at least one user not in the first plurality of users. In some embodiments, the activity identifier module 335 aggregates metadata for a plurality of videos associated with an activity and identifies metadata patterns based on the aggregated metadata. As used herein, "tagging" a video with an activity refers to the association of the video with the activity. Activities tagged in videos can be used as a basis to identify best scenes in videos (as described above), and to select video clips for inclusion in video summary templates (as described below).

Videos tagged with activities can be automatically uploaded to or shared with an external system. For instance, if a user captures video, the activity identifier module 335 can identify a metadata pattern associated with an activity in metadata of the captured video, in real-time (as the video is being captured), or after the video is captured (for instance, after the video is uploaded to the video server 140). The video editing module 320 can select a portion of the captured video based on the identified activity, for instance a threshold amount of time or frames around a video clip or frame associated with the identified activity. The selected video portion can be uploaded or shared to an external system, for instance via the web server 330. The uploading or sharing of video portions can be based on one or more user settings and/or the activity identified. For instance, a user can select one or more activities in advance of capturing video, and captured video portions identified as including the selected activities can be uploaded automatically to an external system, and can be automatically shared via one or more social media outlets.

Best Scene Identification and Video Summary Generation

The video editing module 320 identifies best scenes associated with the identified events of interest for inclusion in a video summary. Each best scene is a video clip, portion, or scene ("video clips" hereinafter), and can be an entire video or a portion of a video. For instance, the video editing module 320 can identify video clips occurring within a threshold amount of time of an identified event of interest (such as 3 seconds before and after the event of interest), within a threshold number of frames of an identified event of interest (such as 24 frames before and after the event of interest), and the like. The amount of length of a best scene can be pre-determined, and/or can be selected by a user.

The amount or length of video clip making up a best scene can vary based on an activity associated with captured video, based on a type or value of metadata associated with captured video, based on characteristics of the captured video, based on a camera mode used to capture the video, or any other suitable characteristic. For example, if an identified event of interest is associated with an above-threshold velocity, the video editing module 320 can identify all or part of the video corresponding to above-threshold velocity metadata as the best scene. In another example, the length of a video clip identified as a best scene can be greater for events of interest associated with maximum altitude values than for events of interest associated with proximity to a pre-determined location.

For events of interest manually tagged by a user, the length of a video clip identified as a best scene can be pre-defined by the user, can be manually selected by the user upon tagging the event of interest, can be longer than automatically-identified events of interest, can be based on a user-selected tagging or video capture mode, and the like. The amount or length of video clips making up best scenes can vary based on the underlying activity represented in captured video. For instance, best scenes associated with events of interest in videos captured while boating can be longer than best scenes associated with events of interest in videos captured while skydiving.

The identified video portions make up the best scenes as described herein. The video editing module 320 generates a video summary by combining or concatenating some or all of the identified best scenes into a single video. The video summary thus includes video portions of events of interest, beneficially resulting in a playable video including scenes likely to be of greatest interest to a user. The video editing module 320 can receive one or more video summary configuration selections from a user, each specifying one or more properties of the video summary (such as a length of a video summary, a number of best scenes for inclusion in the video summary, and the like), and can generate the video summary according to the one or more video summary configuration selections. In some embodiments, the video summary is a renderable or playable video file configured for playback on a viewing device (such as a monitor, a computer, a mobile device, a television, and the like). The video summary can be stored in the video store 310, or can be provided by the video server 140 to an external entity for subsequent playback. Alternatively, the video editing module 320 can serve the video summary from the video server 140 by serving each best scene directly from a corresponding best scene video file stored in the video store 310 without compiling a singular video summary file prior to serving the video summary. It should be noted that the video editing module 320 can apply one or more edits, effects, filters, and the like to one or more best scenes within the video summary, or to the entire video summary during the generation of the video summary.

In some embodiments, the video editing module 320 ranks identified best scenes. For instance, best scenes can be ranked based on activities with which they are associated, based on metadata associated with the best scenes, based on length of the best scenes, based on a user-selected preference for characteristics associated with the best scenes, or based on any other suitable criteria. For example, longer best scenes can be ranked higher than shorter best scenes. Likewise, a user can specify that best scenes associated with above-threshold velocities can be ranked higher than best scenes associated with above-threshold heart rates. In another example, best scenes associated with jumps or crashes can be ranked higher than best scenes associated with sitting down or walking. Generating a video summary can include identifying and including the highest ranked best scenes in the video summary.

In some embodiments, the video editing module 320 classifies scenes by generating a score associated with each of one or more video classes based on metadata patterns associated with the scenes. Classes can include but are not limited to: content-related classes ("snow videos", "surfing videos", etc.), video characteristic classes ("high motion videos", "low light videos", etc.), video quality classes, mode of capture classes (based on capture mode, mount used, etc.), sensor data classes ("high velocity videos", "high acceleration videos", etc.), audio data classes ("human dialogue videos", "loud videos", etc.), number of cameras used ("single-camera videos", "multi-camera videos", etc.), activity identified within the video, and the like. Scenes can be scored for one or more video classes, the scores can be weighted based on a pre-determined or user-defined class importance scale, and the scenes can be ranked based on the scores generated for the scenes.

In one example, the video editing module 320 analyzes metadata associated with accessed videos chronologically to identify an order of events of interest presented within the video. For example, the video editing module 320 can analyze acceleration data to identify an ordered set of video clips associated with acceleration data exceeding a particular threshold. In some embodiments, the video editing module 320 can identify an ordered set of events occurring within a pre-determined period of time. Each event in the identified set of events can be associated with a best scene; if the identified set of events is chronologically ordered, the video editing module 320 can generate a video summary by a combining video clips associated with each identified event in the order of the ordered set of events.

In some embodiments, the video editing module 320 can generate a video summary for a user using only videos associated with (or captured by) the user. To identify such videos, the video editing module 320 can query the video store 310 to identify videos associated with the user. In some embodiments, each video captured by all users of the video server 140 includes a unique identifier identifying the user that captured the video and identifying the video (as described above). In such embodiments, the video editing module 320 queries the video store 310 with an identifier associated with a user to identify videos associated with the user. For example, if all videos associated with User A include a unique identifier that starts with the sequence "X1Y2Z3" (an identifier unique to User A), the video editing module 320 can query the video store 310 using the identifier "X1Y2Z3" to identify all videos associated with User A. The video editing module 320 can then identify best scenes within such videos associated with a user, and can generate a video summary including such best scenes as described herein.

In addition to identifying best scenes, the video editing module 320 can identify one or more video frames that satisfy a set of pre-determined criteria for inclusion in a video summary, or for flagging to a user as candidates for saving as images/photograph stills. The pre-determined criteria can include metadata criteria, including but not limited to: frames with high motion (or blur) in a first portion of a frame and low motion (or blur) in another portion of a frame, frames associated with particular audio data (such as audio data above a particular magnitude threshold or audio data associated with voices or screaming), frames associated with above-threshold acceleration data, or frames associated with metadata that satisfies any other metadata criteria as described herein. In some embodiments, users can specify metadata criteria for use in flagging one or more video frames that satisfy pre-determined criteria Similarly, in some embodiments, the video editing module 320 can identify metadata patterns or similarities in frames selected by a user to save as images/photograph stills, and can identify subsequent video frames that include the identified metadata patterns or similarities for flagging as candidates to save as images/photograph stills.

Video Summary Templates

In one embodiment, the video editing module 320 retrieves video summary templates from the template store 315 to generate a video summary. The template store 315 includes video summary templates each describing a sequence of video slots for including in a video summary. In one example, each video summary template may be associated with a type of activity performed by the user while capturing video or the equipment used by the user while capturing video. For example, a video summary template for generating video summaries of a ski tip can differ from the video summary template for generating video summaries of a mountain biking trip.

Each slot in a video summary template is a placeholder to be replaced by a video clip or scene when generating a video summary. Each slot in a video summary template can be associated with a pre-defined length, and the slots collectively can vary in length. The slots can be ordered within a template such that once the slots are replaced with video clips, playback of the video summary results in the playback of the video clips in the order of the ordered slots replaced by the video clips. For example, a video summary template may include an introductory slot, an action slot, and a low-activity slot. When generating the video summary using such a template, a video clip can be selected to replace the introductory slot, a video clip of a high-action event can replace the action slot, and a video clip of a low-action event can replace the low-activity slot. It should be noted that different video summary templates can be used to generate video summaries of different lengths or different kinds.

In some embodiments, video summary templates include a sequence of slots associated with a theme or story. For example, a video summary template for a ski trip may include a sequence of slots selected to present the ski trip narratively or thematically. In some embodiments, video summary templates include a sequence of slots selected based on an activity type. For example, a video summary template associated with surfing can include a sequence of slots selected to highlight the activity of surfing.

Each slot in a video summary template can identify characteristics of a video clip to replace the slot within the video summary template, and a video clip can be selected to replace the slot based on the identified characteristics. For example, a slot can identify one or more of the following video clip characteristics: motion data associated with the video clip, altitude information associated with the video clip, location information associated with the video clip, weather information associated with the clip, or any other suitable video characteristic or metadata value or values associated with a video clip. In these embodiments, a video clip having one or more of the characteristics identified by a slot can be selected to replace the slot.

In some embodiments, a video clip can be selected based on a length associated with a slot. For instance, if a video slot specifies a four-second length, a four-second (give or take a pre-determined time range, such as 0.5 seconds) video clip can be selected. In some embodiments, a video clip shorter than the length associated with a slot can be selected, and the selected video clip can replace the slot, reducing the length of time taken by the slot to be equal to the length of the selected video clip Similarly, a video clip longer than the length associated with a slot can be selected, and either 1) the selected video clip can replace the slot, expanding the length of time associated with the slot to be equal to the length of the selected video clip, or 2) a portion of the selected video clip equal to the length associated with the slot can be selected and used to replace the slot. In some embodiments, the length of time of a video clip can be increased or decreased to match the length associated with a slot by adjusting the frame rate of the video clip to slow down or speed up the video clip, respectively. For example, to increase the amount of time taken by a video clip by 30%, 30% of the frames within the video clip can be duplicated. Likewise, to decrease the amount of time taken by a video clip by 60%, 60% of the frames within the video clip can be removed.

To generate a video summary using a video summary template, the video editing module 320 accesses a video summary template from the template store 315. The accessed video summary template can be selected by a user, can be automatically selected (for instance, based on an activity type or based on characteristics of metadata or video for use in generating the video summary), or can be selected based on any other suitable criteria. The video editing module 320 then selects a video clip for each slot in the video summary template, and inserts the selected video clips into the video summary in the order of the slots within the video summary template.

To select a video clip for each slot, the video editing module 320 can identify a set of candidate video clips for each slot, and can select from the set of candidate video clips (for instance, by selecting the determined best video from the set of candidate video clips according to the principles described above). In some embodiments, selecting a video clip for a video summary template slot identifying a set of video characteristics includes selecting a video clip from a set of candidate video clips that include the identified video characteristics. For example, if a slot identifies a video characteristic of "velocity over 15 mph", the video editing module 320 can select a video clip associated with metadata indicating that the camera or a user of the camera was traveling at a speed of over 15 miles per hour when the video was captured, and can replace the slot within the video summary template with the selected video clip.

In some embodiments, video summary template slots are replaced by video clips identified as best scenes (as described above). For instance, if a set of candidate video clips are identified for each slot in a video summary template, if one of the candidate video slips identified for a slot is determined to be a best scene, the best scene is selected to replace the slot. In some embodiments, multiple best scenes are identified for a particular slot; in such embodiments, one of the best scenes can be selected for inclusion into the video summary based on characteristics of the best scenes, characteristics of the metadata associated with the best scenes, a ranking of the best scenes, and the like. It should be noted that in some embodiments, if a best scene or other video clip cannot be identified as an above-threshold match for clip requirements associated with a slot, the slot can be removed from the template without replacing the slot with a video clip.

In some embodiments, instead of replacing a video summary template slot with a video clip, an image or frame can be selected and can replace the slot. In some embodiments, an image or frame can be selected that satisfies one or more pre-determined criteria for inclusion in a video summary as described above. In some embodiments, an image or frame can be selected based on one or more criteria specified by the video summary template slot. For example, if a slot specifies one or more characteristics, an image or frame having one or more of the specified characteristics can be selected. In some embodiments, the video summary template slot can specify that an image or frame is to be selected to replace the slot. When an image or frame is selected and used to replace a slot, the image or frame can be displayed for the length of time associated with the slot. For instance, if a slot is associated with a four-second period of display time, an image or frame selected and used to replace the slot can be displayed for the four-second duration.

In some embodiments, when generating a video summary using a video summary template, the video editing module 320 can present a user with a set of candidate video clips for inclusion into one or more video summary template slots, for instance using a video summary generation interface. In such embodiments, the user can presented with a pre-determined number of candidate video clips for a particular slot, and, in response to a selection of a candidate scene by the user, the video editing module 320 can replace the slot with the selected candidate video clip. In some embodiments, the candidate video clips presented to the user for each video summary template slot are the video clips identified as best scenes (as described above). Once a user has selected a video clip for each slot in a video summary template, the video editing module 320 generates a video summary using the user-selected video clips based on the order of slots within the video summary template.

In one embodiment, the video editing module 320 generates video summary templates automatically, and stores the video summary templates in the template store 315. The video summary templates can be generated manually by experts in the field of video creation and video editing. The video editing module 320 may provide a user with a user interface allowing the user to generate video summary templates. Video summary templates can be received from an external source, such as an external template store. Video summary templates can be generated based on video summaries manually created by users, or based on an analysis of popular videos or movies (for instance by including a slot for each scene in a video).

System Operation

Figure 4:
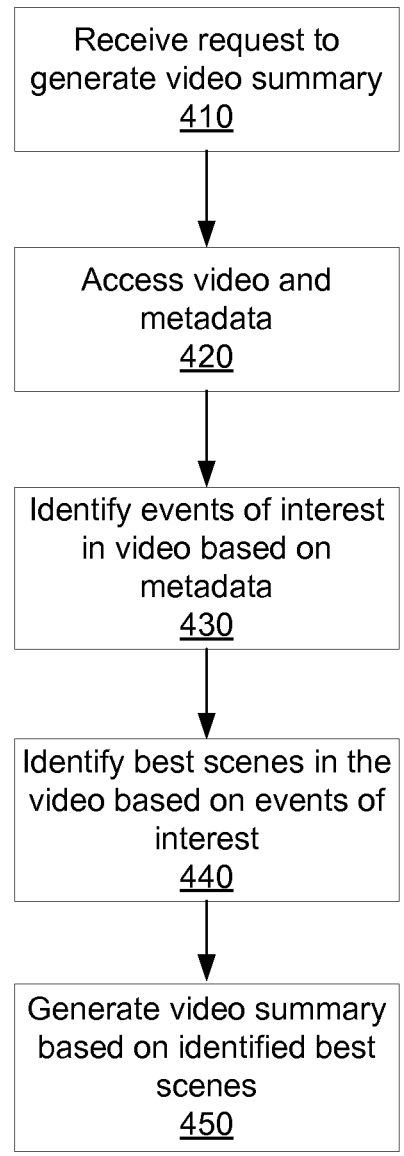
FIG. 4 is a flowchart illustrating a method for selecting video portions to include in a video summary, according to one embodiment.

FIG. 4 is a flowchart illustrating a method for selecting video portions to include in a video summary, according to one embodiment. A request to generate a video summary is received 410. The request can identify one or more videos for which a video summary is to be generated. In some embodiments, the request can be received from a user (for instance, via a video summary generation interface on a computing device), or can be received from a non-user entity (such as the video server 140 of FIG. 1). In response to the request, video and associated metadata is accessed 420. The metadata includes data describing characteristics of the video, the context or environment in which the video was captured, characteristics of the user or camera that captured the video, or any other information associated with the capture of the video. As described above, examples of such metadata include telemetry data describing the acceleration or velocity of the camera during the capture of the video, location or altitude data describing the location of the camera, environment data at the time of video capture, biometric data of a user at the time of video capture, and the like.

Events of interest within the accessed video are identified 430 based on the accessed metadata associated with the video. Events of interest can be identified based on changes in telemetry or location data within the metadata (such as changes in acceleration or velocity data), based on above-threshold values within the metadata (such as a velocity threshold or altitude threshold), based on local maximum or minimum values within the data (such as a maximum heart rate of a user), based on the proximity between metadata values and other values, or based on any other suitable criteria. Best scenes are identified 440 based on the identified events of interest. For instance, for each event of interest identified within a video, a portion of the video corresponding to the event of interest (such as a threshold amount of time or a threshold number of frames before and after the time in the video associated with the event of interest) is identified as a best scene. A video summary is then generated 450 based on the identified best scenes, for instance by concatenating some or all of the best scenes into a single video.

Figure 5:
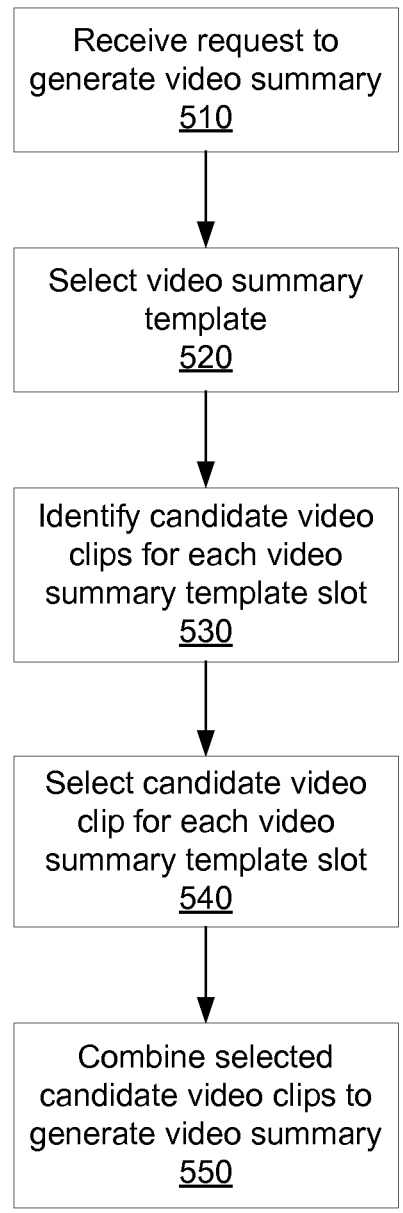
FIG. 5 is a flowchart illustrating a method for generating video summaries using video templates, according to one embodiment.

FIG. 5 is a flowchart illustrating a method for generating video summaries using video templates, according to one embodiment. A request to generate a video summary is received 510. A video summary template is selected 520 in response to receiving the request. The selected video summary template can be a default template, can be selected by a user, can be selected based on an activity type associated with captured video, and the like. The selected video summary template includes a plurality of slots, each associated with a portion of the video summary. The video slots can specify video or associated metadata criteria (for instance, a slot can specify a high-acceleration video clip).

A set of candidate video clips is identified 530 for each slot, for instance based on the criteria specified by each slot, based on video clips identified as "best scenes" as described above, or based on any other suitable criteria. For each slot, a candidate video clip is selected 540 from among the set of candidate video clips identified for the slot. In some embodiments, the candidate video clips in each set of candidate video clips are ranked, and the most highly ranked candidate video clip is selected. The selected candidate video clips are combined 550 to generate a video summary. For instance, the selected candidate video clips can be concatenated in the order of the slots of the video summary template with which the selected candidate video clips correspond.

Figure 6:
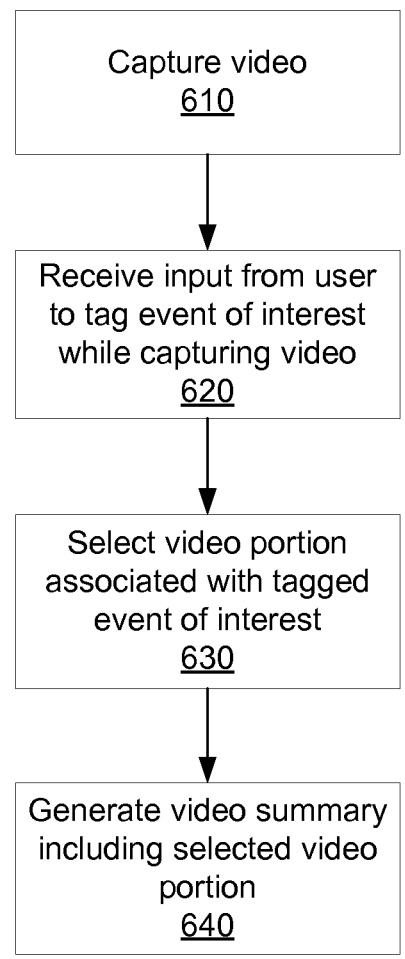
FIG. 6 is a flowchart illustrating a method for generating video summaries of videos associated with user-tagged events, according to one embodiment.

FIG. 6 is a flowchart illustrating a method for generating video summaries of videos associated with user-tagged events, according to one embodiment. Video is captured 610 by a user of a camera. During video capture, an input is received 620 from the user indicating an event of interest within the captured video. The input can be received, for instance, through the selection of a camera button, a camera interface, or the like. An indication of the user-tagged event of interest is stored in metadata associated with the captured video. A video portion associated with the tagged event of interest is selected 630, and a video summary including the selected video portion is generated 640. For instance, the selected video portion can be a threshold number of video frames before and after a frame associated with the user-tagged event, and the selected video portion can be included in the generated video summary with one or more other video portions.

Figure 7:
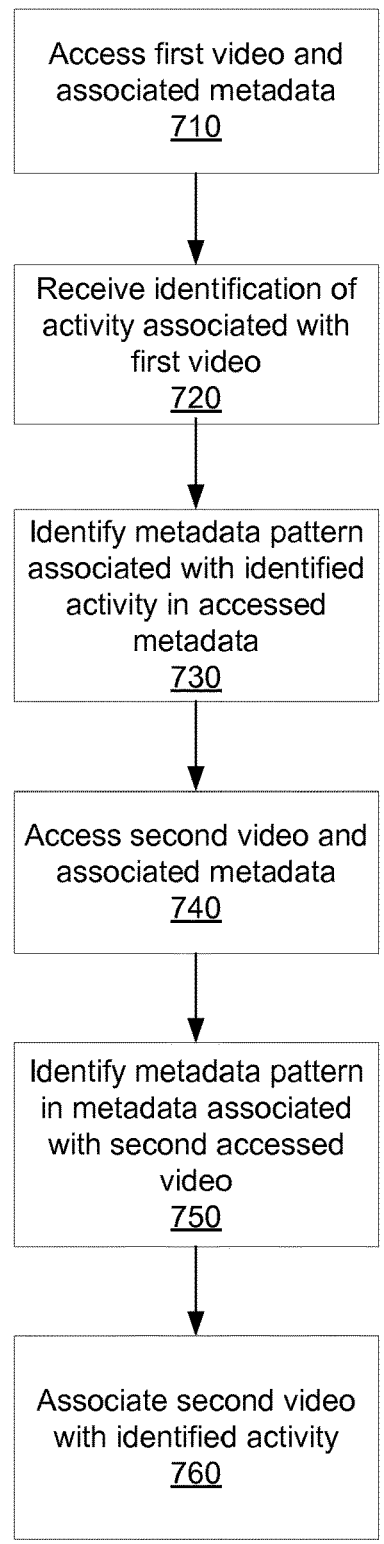
FIG. 7 is a flowchart illustrating a method of identifying an activity associated with a video, according to one embodiment.

FIG. 7 is a flowchart illustrating a method 700 of identifying an activity associated with a video, according to one embodiment. A first video and associated metadata is accessed 710. An identification of an activity associated with the first video is received 720. For instance, a user can identify an activity in the first video during post-processing of the first video, or during the capture of the first video. A metadata pattern associated with the identified activity is identified 730 within the accessed metadata. The metadata pattern can include, for example, a defined change in acceleration metadata and altitude metadata.

A second video and associated metadata is accessed 740. The metadata pattern is identified 750 within the metadata associated with the second video. Continuing with the previous example, the metadata associated with the second video is analyzed and the defined change in acceleration metadata and altitude metadata is identified within the examined metadata. In response to identifying the metadata pattern within the metadata associated with the second video, the second video is associated 750 with the identified activity.

Figure 8:
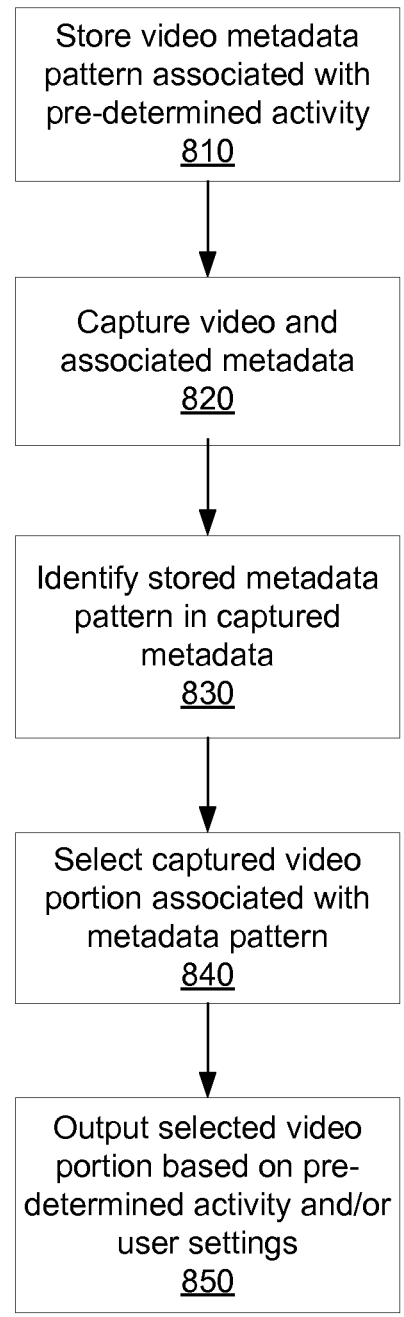
FIG. 8 is a flowchart illustrating a method of sharing a video based on an identified activity within the video, according to one embodiment.

FIG. 8 is a flowchart illustrating a method 800 of sharing a video based on an identified activity within the video, according to one embodiment. Metadata patterns associated with one or more pre-determined activities are stored 810. Video and associated metadata are subsequently captured 820, and a stored metadata pattern associated with an activity is identified 830 within the captured metadata. A portion of the captured video associated with the metadata pattern is selected 840, and is outputted 850 based on the activity associated with the identified metadata pattern and/ or one or more user settings. For instance, a user can select "snowboarding jump" and "3 seconds before and after" as an activity and video portion length, respectively. In such an example, when a user captures video, a metadata pattern associated with a snowboarding jump can be identified, and a video portion consisting of 3 seconds before and 3 seconds after the video associated with the snowboarding jump can automatically be uploaded to a social media outlet.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying an event of interest in a video, the method performed by a camera including one or more processors, the method comprising:
accessing, by the camera, a captured speech pattern, the captured speech pattern captured from a user at a moment during capture of the video;
matching, by the camera, the captured speech pattern to a given stored speech pattern of multiple stored speech patterns, the multiple stored speech patterns corresponding to a command for identifying the event of interest within the video, individual ones of the multiple stored speech patterns stored based on a number of times the individual ones of the multiple stored speech patterns are captured by the camera from a user while the camera is operating in a training mode, wherein the individual ones of the multiple stored speech patterns correspond to an identification of the event of interest as occurring before, during, or after the moment; and
in response to matching the captured speech pattern to the given stored speech pattern, storing, by the camera, event of interest information associated with the video, the event of interest information identifying an event moment during the capture of the video at which the event of interest occurs, the event moment being determined to occur before, during, or after the moment based on the matching of the captured speech pattern to the given stored speech pattern.

2. The method of claim 1, further comprising:
identifying a portion of the video as a video clip associated with the event of interest based on the event of interest information, the video clip comprising a first amount of the video occurring before the event moment and a second amount of the video occurring after the event moment, the first amount and the second
storing clip information indicating the association of the video clip with the event of interest and the portion of the video included in the video clip.

3. The method of claim 2, further comprising:
receiving a request to generate a video summary; and
generating the video summary in response to the request, the video summary comprising the video clip associated with the event of interest.

4. The method of claim 1, wherein the event of interest corresponds to an activity type, wherein the given stored speech pattern identifies the activity type, and wherein storing the event of interest information comprises storing an indication of the activity type in metadata associated with the video.

5. The method of claim 1, wherein the given stored speech pattern is specific to the user.

6. The method of claim 1, wherein the given stored speech pattern includes a speech pattern of a spoken word.

7. The method of claim 1, wherein the given stored speech pattern includes a speech pattern of a spoken phrase.

8. A system for identifying an event of interest in a video, the system comprising:
one or more processors configured by instructions to:
access a captured speech pattern, the captured speech pattern captured from a user at a moment during capture of the video;
match the captured speech pattern to a given stored speech pattern of multiple stored speech patterns, the multiple stored speech patterns corresponding to a command for identifying the event of interest within the video, individual ones of the multiple stored speech patterns stored based on a number of times the individual ones of the multiple stored speech patterns are captured by the camera from a user while the camera is operating in a training mode, wherein the individual ones of the multiple stored speech patterns correspond to an identification of the event of interest as occurring before, during, or after the moment; and
in response a match of the captured speech pattern to the given stored speech pattern, store event of interest information associated with the video, the event of interest information identifying an event moment during the capture of the video at which the event of interest occurs, the event moment being determined to occur before, during, or after the moment based on the matching of the captured speech pattern to the given stored speech pattern.

9. The system of claim 8, wherein the one or more processors are further configured to:
identify a portion of the video as a video clip associated with the event of interest based on the event of interest information, the video clip comprising a first amount of the video occurring before the event moment and a second amount of the video occurring after the event moment, the first amount and the second amount being determined based on the matching of the captured speech pattern to the given stored speech pattern; and
store clip information indicating the association of the video clip with the event of interest and the portion of the video included in the video clip.

10. The system of claim 9, wherein the one or more processors are further configured to:
receive a request to generate a video summary; and
generate the video summary in response to the request, the video summary comprising the video clip associated with the event of interest.

11. The system of claim 8, wherein the event of interest corresponds to an activity type, wherein the given stored speech pattern identifies the activity type, and wherein the event of interest information is stored such that an indication of the activity type is stored in metadata associated with the video.

12. The system of claim 8, wherein the given stored speech pattern is specific to the user.

13. The system of claim 8, wherein the given stored speech pattern includes a speech pattern of a spoken word.

14. The system of claim 8, wherein the given stored speech pattern includes a speech pattern of a spoken phrase.

15. A non-transitory computer-readable storage medium storing instructions for identifying an event of interest in a video, the instructions, when executed, causing one or more processors to:
  access a captured speech pattern, the captured speech pattern captured from a user at a moment during capture of the video;
  match the captured speech pattern to a given stored speech pattern of multiple stored speech patterns, the multiple stored speech patterns corresponding to a command for identifying the event of interest within the video, individual ones of the multiple stored speech patterns stored based on a number of times the individual ones of the multiple stored speech patterns are captured by the camera from a user while the camera is operating in a training mode, wherein the individual ones of the multiple stored speech patterns correspond to an identification of the event of interest as occurring before, during, or after the moment; and
  in response a match of the captured speech pattern to the given stored speech pattern, store event of interest information associated with the video, the event of interest information identifying an event moment during the capture of the video at which the event of interest occurs, the event moment being determined to occur before, during, or after the moment based on the matching of the captured speech pattern to the given stored speech pattern.

16. The computer-readable storage medium of claim 15, wherein the instructions, when executed, further cause the one or more processors to:
  identify a portion of the video as a video clip associated with the event of interest based on the event of interest information, the video clip comprising a first amount of the video occurring before the event moment and a second amount of the video occurring after the event moment, the first amount and the second amount being determined based on the matching of the captured speech pattern to the given stored speech pattern; and
  store clip information indicating the association of the video clip with the event of interest and the portion of the video included in the video clip.

17. The computer-readable storage medium of claim 16, wherein instructions, when executed, further cause the one or more processors to:
  receive a request to generate a video summary; and
  generate the video summary in response to the request, the video summary comprising the video clip associated with the event of interest.

18. The computer-readable storage medium of claim 15, wherein the event of interest corresponds to an activity type, wherein the given stored speech pattern identifies the activity type, and wherein the event of interest information is stored such that an indication of the activity type is stored in metadata associated with the video.

19. The computer-readable storage medium of claim 15, wherein the given stored speech pattern is specific to the user.

20. The computer-readable storage medium of claim 15, wherein the given stored speech pattern includes a speech pattern of a spoken word or a spoken phrase.

* * * * *